United States Patent
Seo et al.

(10) Patent No.: US 10,575,049 B2
(45) Date of Patent: Feb. 25, 2020

(54) BROADCASTING SIGNAL RECEIVING APPARATUS AND CONTROL METHOD THEREOF

(71) Applicant: SAMSUNG ELECTRONICS CO., LTD., Suwon-si, Gyeonggi-do (KR)

(72) Inventors: Da-som Seo, Yongin-si (KR); Sang-mook Lim, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/343,449

(22) Filed: Nov. 4, 2016

(65) Prior Publication Data
US 2017/0134798 A1    May 11, 2017

(30) Foreign Application Priority Data
Nov. 5, 2015    (KR) .................. 10-2015-0155233

(51) Int. Cl.
*H04N 21/438*    (2011.01)
*H04N 21/433*    (2011.01)
(Continued)

(52) U.S. Cl.
CPC ....... *H04N 21/4383* (2013.01); *H04N 21/433* (2013.01); *H04N 21/435* (2013.01); *H04N 21/63* (2013.01); *H04N 21/84* (2013.01)

(58) Field of Classification Search
CPC ............. H04N 21/4383; H04N 21/433; H04N 21/435; H04N 21/63; H04N 21/64
See application file for complete search history.

(56) References Cited

U.S. PATENT DOCUMENTS 5,227,863 A    7/1993    Bilbrey et al.
5,594,492 A    1/1997    O'Callaghan et al.
(Continued)

FOREIGN PATENT DOCUMENTS

CN    1791200    6/2006
CN    101877694    11/2010
(Continued)

OTHER PUBLICATIONS

Search Report and Written Opinion dated Feb. 28, 2017 in counterpart International Patent Application No. PCT/KR2016/012618.
(Continued)

*Primary Examiner* — Yassin Alata
(74) *Attorney, Agent, or Firm* — Nixon & Vanderhye, P.C.

(57) ABSTRACT

An example broadcasting signal receiving apparatus includes a signal receiver configured to receive a broadcasting signal of a channel tuned among a plurality of channels; an information processor configured to process channel information embedded in the broadcasting signal; a plurality of signal processors configured to sequentially perform a plurality of signal processes based on the channel information with respect to the received broadcasting signal; a storage configured to store the channel information processed by the information processor; and a channel-switching setting portion comprising channel-switching setting circuitry configured to perform a channel-switching setting operation for at least one among the plurality of signal processors based on the channel information stored in the storage in response to switching of the channel.

16 Claims, 12 Drawing Sheets

(51) Int. Cl.
  *H04N 21/435* (2011.01)
  *H04N 21/63* (2011.01)
  *H04N 21/84* (2011.01)

(56) References Cited

U.S. PATENT DOCUMENTS

| | | | |
|---|---|---|---|
| 2006/0045034 A1* | 3/2006 | Kwon | H04W 36/06 370/310 |
| 2006/0104237 A1 | 5/2006 | Ryu | |
| 2006/0126488 A1 | 6/2006 | Kang | |
| 2007/0280298 A1 | 12/2007 | Hearn et al. | |
| 2009/0031392 A1 | 1/2009 | VerSteeg et al. | |
| 2011/0134336 A1* | 6/2011 | Kim | H04N 5/50 348/731 |
| 2014/0237531 A1 | 8/2014 | Kitahara et al. | |
| 2016/0088345 A1* | 3/2016 | Huang | H04N 21/4384 725/27 |

FOREIGN PATENT DOCUMENTS

| | | |
|---|---|---|
| CN | 103297852 | 9/2013 |
| CN | 103875253 | 6/2014 |
| KR | 10-2006-0125265 | 12/2006 |
| KR | 10-0768814 | 10/2007 |
| KR | 10-2009-0131013 | 12/2009 |

OTHER PUBLICATIONS

First Office Action dated Sep. 27, 2019 in counterpart Chinese Application No. 201680039434.X and English-language translation.

* cited by examiner

BROADCASTING SIGNAL RECEIVING APPARATUS AND CONTROL METHOD THEREOF

CROSS-REFERENCE TO RELATED THE APPLICATION

This application is based on and claims priority under 35 U.S.C. § 119 to Korean Patent Application No. 10-2015-0155233 filed on Nov. 5, 2015 in the Korean Intellectual Property Office, the disclosure of which is incorporated by reference herein in its entirety.

BACKGROUND

Field

The disclosure relates generally to a broadcasting signal receiving apparatus and a control method thereof, and for example, to a broadcasting signal receiving apparatus and a control method thereof, in which channel switching is quickly performed using stored channel information when a channel of a broadcasting signal is switched.

The digital television has to set the tuner, the demultiplexer, the audio/video decoder, the scaler and the like elements again in accordance with broadcast stream information when a channel is switched.

In a case of a channel viewed for the first time, there is a need of waiting until the broadcasting signal is fully received. Even if the channel is not viewed for the first time, a database having information about a previously received broadcasting signal has to be referred to and a changing point due to an actual signal has to be continuously taken into account. Therefore, time taken in switching the channel may slow down in accordance with performance of a central processing unit (CPU) in the TV.

Further, in exceptional circumstances of, for example, a need of limiting TV watching based on rating information, switching to a channel having no information other than frequency and a need of distributing software (S/W) resources to a restricted hardware (H/W) component, time taken in switching the channel may slow down since H/W is controlled after S/W is intervened and processed to receive a broadcasting signal when the channel is switched.

However, the exceptional circumstances in terms of switching a channel are negligible, and it is thus generally possible to quickly switch a channel without intervention of S/W. Accordingly, there is a need of processing a broadcasting signal so that a channel can be more quickly switched under the circumstances that are not exceptional but general.

SUMMARY

Accordingly, an example aspect of one or more example embodiments may provide a broadcasting signal receiving apparatus and a control method thereof, in which stored channel information is applied in a lump to a plurality of signal processes when a channel of a broadcasting signal is switched, thereby quickly switching the channel.

Another example aspect of one or more example embodiments may provide a broadcasting signal receiving apparatus and a control method thereof, in which processing of channel information included in a broadcasting signal and setting of a plurality of signal processes are performed in parallel when a channel is switched.

According to an example embodiment, a broadcasting signal receiving apparatus is provided, comprising: a signal receiver configured to receive a broadcasting signal of a tuned channel from among a plurality of channels; an information processor configured to process channel information embedded in the broadcasting signal; a plurality of signal processors configured to sequentially perform a plurality of signal processes based on the channel information with respect to the received broadcasting signal; a storage configured to store the channel information processed by the information processor; and channel-switching setting circuitry configured to perform a channel-switching setting operation for at least one among the plurality of signal processors based on the channel information stored in the storage in response to switching of the channel.

According to this example embodiment, when a channel of a broadcasting signal is switched, it is possible to quickly switch the channel using the stored channel information. Further, when a channel is switched, the process of the channel information embedded in the broadcasting signal is performed in parallel with the setting operations for the plurality of signal processes, thereby minimizing and/or reducing dependence on performance of a CPU.

The channel-switching setting circuitry may be configured to simultaneously perform the channel-switching setting operations respectively corresponding to the plurality of signal processes performed by the plurality of signal processors. Thus, when a channel is switched, the stored channel information is used to simultaneously perform the setting operations for the plurality of signal processes, thereby improving channel-switching speed.

The information processor may determine whether the channel information stored in the storage is different from the channel information embedded in the received broadcasting signal. Thus, when a channel is switched, it is possible to determine whether the channel information is changed, while performing the setting operations for the plurality of signal processes.

The channel-switching setting circuitry may perform the channel-switching setting operation based on the channel information embedded in the received broadcasting signal if the channel information stored in the storage is different from the channel information embedded in the received broadcasting signal. Thus, when a channel is switched, the currently received channel information is used to perform the setting operations for the plurality of signal processes if the channel information is changed.

The channel-switching setting circuitry may perform the channel-switching setting operation based on the channel information embedded in the received broadcasting signal if the channel information is not stored in the storage. Thus, when a channel is switched, the currently received channel information is used to perform the setting operations for the plurality of signal processes if there are no previously stored channel information.

The channel information may comprise at least one among audio/video packet identification (A/V PID), resolution information and rating information embedded in the broadcasting signal. Thus, the channel information is stored for each of the plurality of signal processes, and then the stored channel information is used to quickly perform the setting operation for the signal process when a channel is switched in the future.

The plurality of signal processors may comprise a tuner, a demultiplexer, a decoder, and a scaler. Thus, when a channel is switched, the tuner, the demultiplexer, the decoder and the scaler can perform the setting operation for the signal process.

The channel-switching setting operation may comprise an operation of setting the tuner to perform a tuner lock check operation. Thus, when a channel is switched, the tuner performs a tuner lock check operation, thereby checking whether the received broadcasting signal is sensed.

The channel-switching setting operation may comprise an operation of setting the demultiplexer to extract audio and video data from the broadcasting signal by using audio/video packet identification (A/V PID) of the stored channel information. Thus, when a channel is switched, the demultiplexer extracts audio and video data from the received broadcasting signal by using the stored PID information.

The channel-switching setting operation may comprise an operation of setting the decoder to decode audio and video data with respect to the broadcasting signal by using resolution information of the stored channel information. Thus, when a channel is switched, the decoder decodes audio and video data by using the resolution information.

The channel-switching setting operation may comprise an operation of setting the scaler to determine whether to display an image of the broadcasting signal based on rating information of the stored channel information. Thus, when a channel is switched, the scaler determines whether to display an image on a screen based on the stored rating information.

According to another example embodiment, a method of controlling a broadcasting signal receiving apparatus is provided, the method comprising: receiving a broadcasting signal of a channel tuned among a plurality of channels; processing channel information embedded in the broadcasting signal; performing a plurality of signal processes in sequence based on the channel information with respect to the received broadcasting signal; storing the channel information processed by the information processor; and performing a channel-switching setting operation for at least one among the plurality of signal processes based on the stored channel information in response to switching of the channel.

According to this example embodiment, when a channel of a broadcasting signal is switched, it is possible to quickly switch the channel using the stored channel information. Further, when a channel is switched, the process of the channel information embedded in the broadcasting signal is performed in parallel with the setting operations for the plurality of signal processes, thereby minimizing and/or reduce dependence on performance of a CPU.

The method may further comprise simultaneously performing the channel-switching setting operations respectively corresponding to the plurality of signal processes. Thus, when a channel is switched, the stored channel information is used to simultaneously perform the setting operations for the plurality of signal processes, thereby improving channel-switching speed.

The method may further comprise determining whether the stored channel information is different from the channel information embedded in the received broadcasting signal. Thus, when a channel is switched, it is possible to determine whether the channel information is changed, while performing the setting operations for the plurality of signal processes.

The method may further comprise performing the channel-switching setting operation based on the channel information embedded in the received broadcasting signal if the stored channel information is different from the channel information embedded in the received broadcasting signal. Thus, when a channel is switched, the currently received channel information is used to perform the setting operations for the plurality of signal processes if the channel information is changed.

The method may further comprise performing the channel-switching setting operation based on the channel information embedded in the received broadcasting signal if the channel information is not stored. Thus, when a channel is switched, the currently received channel information is used to perform the setting operations for the plurality of signal processes if there are no previously stored channel information.

The channel information may comprise at least one among audio/video packet identification (A/V PID), resolution information and rating information embedded in the broadcasting signal. Thus, the channel information is stored for each of the plurality of signal processes, and then the stored channel information is used to quickly perform the setting operation for the signal process when a channel is switched in the future.

The plurality of signal processors may comprise tuning, demultiplexing, decoding and scaling. Thus, when a channel is switched, the tuner, the demultiplexer, the decoder and the scaler can perform the setting operation for the signal process.

The channel-switching setting operation may comprise, in the tuning, a setting operation to perform a tuner lock check operation. Thus, when a channel is switched, the tuner performs a tuner lock check operation, thereby checking whether the received broadcasting signal is sensed.

The channel-switching setting operation may comprise, in the demultiplexing, a setting operation to extract audio and video data from the broadcasting signal by using audio/video packet identification (A/V PID) of the stored channel information. Thus, when a channel is switched, the demultiplexer extracts audio and video data from the received broadcasting signal by using the stored PID information.

The channel-switching setting operation may comprise, in the decoding, a setting operation to decode audio and video data with respect to the broadcasting signal by using resolution information of the stored channel information. Thus, when a channel is switched, the decoder decodes audio and video data by using the resolution information.

The channel-switching setting operation may comprise, in the scaling, a setting operation to determine whether to display an image of the broadcasting signal based on rating information of the stored channel information. Thus, when a channel is switched, the scaler determines whether to display an image on a screen based on the stored rating information.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Below, example embodiments will be described in greater detail with reference to accompanying drawings so that they can be easily realized by a person having an ordinary skill in the art. The present disclosure may be achieved in various forms and not limited to the following embodiments. For convenience of description, parts not directly related to the present disclosure are omitted, and like numerals refer to like elements throughout.

Figure 1:
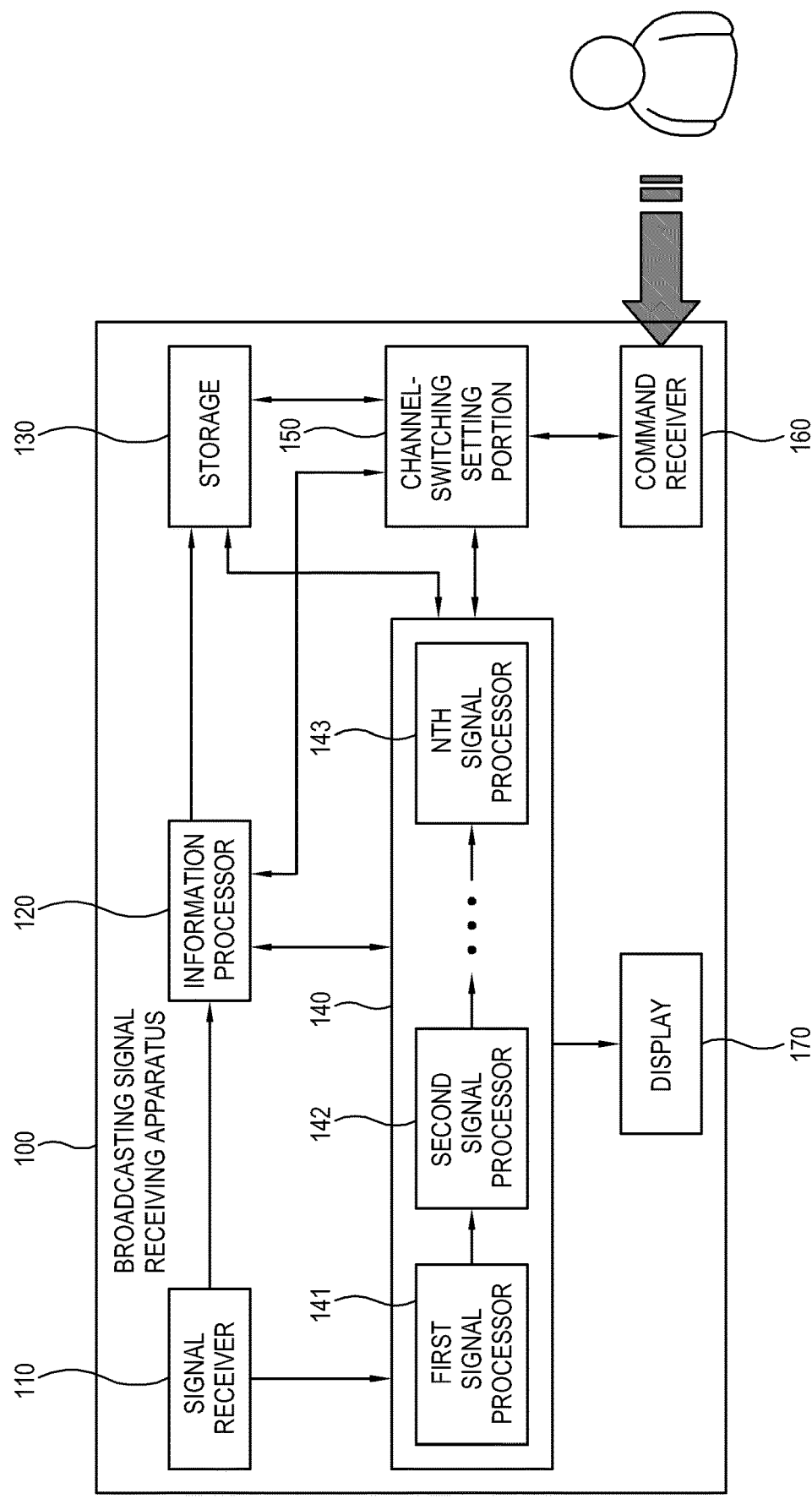
FIG. 1 is a block diagram illustrating an example broadcasting signal receiving apparatus according to an example embodiment.

FIG. 1 is a block diagram illustrating an example broadcasting signal receiving apparatus according to an example embodiment. As illustrated in FIG. 1, a broadcasting signal receiving apparatus 100 according to an example embodiment includes a signal receiver 110, an information processor (e.g., including processing circuitry) 120, a storage 130, a signal processor (e.g., including signal processing circuitry) 140, a channel switching setting portion (e.g., including channel switching setting circuitry) 150, a command receiver (e.g., including receiving circuitry) 160 and a display 170, and may be for example achieved by a TV, a smart phone, a tablet computer, a personal computer, a notebook computer, or the like display apparatus, but is not limited thereto. The signal processor 140 may include a first signal processor 141, a second signal processor 142, . . . , an Nth signal processor 143, and may be for example achieved by various signal processing circuitry, such as, for example, and without limitation, a tuner, a demultiplexer, an audio/video decoder, a scaler, etc. The elements included in the broadcasting signal receiving apparatus 100 according to this example embodiment are not limited to the foregoing description, and may include other additional elements.

The broadcasting signal receiving apparatus 100 receives a broadcasting signal of a channel tuned among a plurality of channels, and processes channel information embedded in the broadcasting signal. The broadcasting signal receiving apparatus 100 performs a plurality of signal processes in sequence with respect to the received broadcasting signal based on the channel information. The broadcasting signal receiving apparatus 100 stores the processed channel information. The broadcasting signal receiving apparatus 100 performs a channel-switching setting operation for at least one among the plurality of signal processes based on the stored channel information, in response to channel switching.

According to this example embodiment, the broadcasting signal receiving apparatus 100 has an effect on switching a channel quickly using the stored channel information when a channel of a broadcasting signal is switched. Further, when the channel is switched, the process for the channel information embedded in the broadcasting signal and the setting operation for the plurality of signal processes are performed in parallel, thereby minimizing and/or reducing dependence on performance of a central processing unit (CPU).

The signal receiver 110 includes various signal receiving circuitry that receives a broadcasting signal of a channel tuned among the plurality of channels. The signal receiver 110 may be provided in various forms in accordance with the formats of the broadcasting signal and the types of the broadcasting signal receiving apparatus 100. For example, the signal receiver 110 may be achieved by various signal receiving circuitry, including, for example, and without limitation, a tuner for receiving a radio frequency (RF) broadcasting signal or a satellite signal from a broadcasting station.

The command receiver 160 includes various receiving circuitry that receives a command from a user. For example, the command receiver 160 may include various command receiving circuitry, such as, for example, and without limitation, at least one of a keyboard, a mouse, etc., and may be achieved by an input panel provided outside the broadcasting signal receiving apparatus 100. According to an example embodiment, the command receiver 160 may receive a user command through a remote controller. Further, the user command may include at least one of menu selection, shortcut-key input, voice command, and motion recognition. The user command received in the command receiver 160 may be transmitted to the channel switching setting portion 150, so that a corresponding operation can be carried out.

The information processor 120 may include various processing circuitry that processes the channel information embedded in the broadcasting signal received in the signal receiver 110. The information processor 120 may include various processing circuitry, such as, for example, and without limitation, the CPU, and execute software (S/W). The channel information may for example include at least one of audio/video packet identification (A/V PID), resolution information and rating information. Further, the information processor 120 analyzes whether the channel information stored in the storage 130 is different from the channel information embedded in the broadcasting signal, and offers information to the channel switching setting portion 150 so that the channel switching setting portion 150 can determine which one between the stored channel information and the received channel information will be used to carry out the setting operation for the signal process.

The storage 130 stores channel information processed by the information processor 120. According to an example embodiment, the storage 130 processes and stores channel information embedded in a broadcasting signal of a previously viewed channel, so that the channel switching setting portion 150 can perform the setting operations for the plurality of signal processes by referring to the stored channel information when the channel is switched in the future. The channel information stored in the storage 130 may for example include at least one among the A/V PID, the resolution information and the rating information.

The signal processor 140 may include various signal processing circuitry that performs the plurality of signal processes in sequence with respect to the broadcasting signal received in the signal receiver 110. The signal processor 140 may include a number of processors including processing circuitry, including, for example, the first signal processor 141, the second signal processor 142, . . . , the Nth signal processor 143, and may include various signal processing circuitry, such as, for example, and without limitation, the tuner, the demultiplexer, the audio/video decoder, the scaler, etc. The signal processor 140 may perform the plurality of signal processes in sequence based on the channel information processed by the information processor 120 or the channel information stored in the storage 130. The plurality of signal processes may for example include locking the received broadcasting signal, extracting and decoding audio and video data from the received broadcasting signal, scaling and A/V muting. The kinds of signal processes performed in the signal processor 140 are not limited to this example embodiment, and may additionally include other signal processes.

The display 170 displays an image based on the broadcasting signal processed by the signal processor 140. There are no limits to the types of display 170. For example, the display 170 may be variously achieved by a plasma display panel (PDP), a liquid crystal display (LCD), an organic light emitting diode (OLED), a flexible display, etc.

The channel switching setting portion 150 may include various circuitry configured to perform the channel-switching setting operation for at least one among the plurality of signal processors 140 based on the channel information stored in the storage 130 in response to channel switching. The channel switching may be carried out in response to a user command received from the command receiver 160. The channel switching setting portion 150 may include various channel switching setting circuitry, such as, for example, and without limitation, a hardware (H/W) control module included in a microcomputer (MICOM), e.g., a main controller of the broadcasting signal receiving apparatus 100.

The channel-switching setting operation may for example include an operation of setting the tuner among the plurality of signal processors 140 to check tuner lock. Further, the channel-switching setting operation may for example include an operation of setting the demultiplexer among the plurality of signal processors 140 to extract audio and video data based on the A/V PID stored in the storage 130. The channel-switching setting operation may for example include an operation of setting the decoder among the plurality of signal processors 140 to decode the audio and video data of the broadcasting signal based on the resolution information stored in the storage 130. The channel-switching setting operation may for example include an operation of setting the scaler among the plurality of signal processors 140 to display an image of a broadcasting signal based on the rating information stored in the storage 130

Like this, the channel switching setting portion 150 may perform the operations of setting the plurality of signal processors 140 to do the signal processes by referring to the channel information, respectively needed for performing the plurality of signal processes, from the storage 130 when a channel is switched. Thus, the plurality of signal processes is performed by referring to the channel information previously stored in the storage 130 without waiting until the received channel information embedded in the broadcasting signal is processed by the information processor 120, thereby having an effect on switching a channel quickly.

According to an example embodiment, the channel switching setting portion 150 may simultaneously perform the channel-switching setting operations for the plurality of signal processes respectively performed by the plurality of signal processors 140. For example, if a user's command for switching a channel is received in the command receiver 160, the channel switching setting portion 150 respectively applies the A/V PID, the resolution information and the rating information stored in the storage 130 to the tuner, the demultiplexer, the decoder and the scaler among the plurality of signal processors 140 in a lump, so that the respective setting operations of the plurality of signal processors 140 can be performed at the same time. In this case, the stored channel information is applied in a lump at a tuning time, and therefore it takes no time to analyze and process the currently received channel information, thereby more quickly performing the setting operation for switching a channel.

According to an example embodiment, the channel switching setting portion 150 may perform the channel-switching setting operation based on the received channel information embedded in the broadcasting signal if the channel information stored in the storage 130 is different from the received channel information embedded in the broadcasting signal. At this time, the information processor 120 may determine whether the channel information stored in the storage 130 is different from the received channel information embedded in the broadcasting signal. That is, while the channel switching setting portion 150 performs the setting operations for the plurality of signal processes based on the stored channel information, the information processor 120 can in parallel do the operation of analyzing whether the stored channel information is different from the received channel information embedded in the broadcasting signal. As an analysis result of the information processor 120, if the stored channel information is different from the received channel information embedded in the broadcasting signal, the channel switching setting portion 150 performs the channel-switching setting operation again using the received channel information embedded in the broadcasting signal, or performs the channel-switching setting operation by replacing the stored channel information with the received channel information.

According to an example embodiment, if the stored channel information is not different from the received channel information embedded in the broadcasting signal, the stored channel information is used in performing the channel-switching setting operations, thereby having an effect on switching a channel more quickly. On the other hand, if the stored channel information is different from the received channel information embedded in the broadcasting signal, the stored channel information is preferentially used in performing the channel-switching setting operations, and the channel-switching setting operations are additionally performed with regard to only the changed channel information, thereby more quickly switching a channel than the case of using the received channel information.

According to an example embodiment, if the channel information is not stored in the storage 130, the channel switching setting portion 150 performs the channel-switching setting operations based on the received channel information embedded in the broadcasting signal. That is, if there are no previously stored channel information, the information processor 120 processes the received channel information embedded in the broadcasting signal and the channel switching setting portion 150 performs the channel-switching setting operation based on the channel information processed by the information processor 120.

Thus, the broadcasting signal receiving apparatus 100 according to an example embodiment uses the stored channel information in performing the channel-switching setting operation if there is the channel information stored in the storage 130, and uses the received channel information in performing the channel-switching setting operation if there are no stored channel information, thereby effectively switching the channel.

Figure 2:
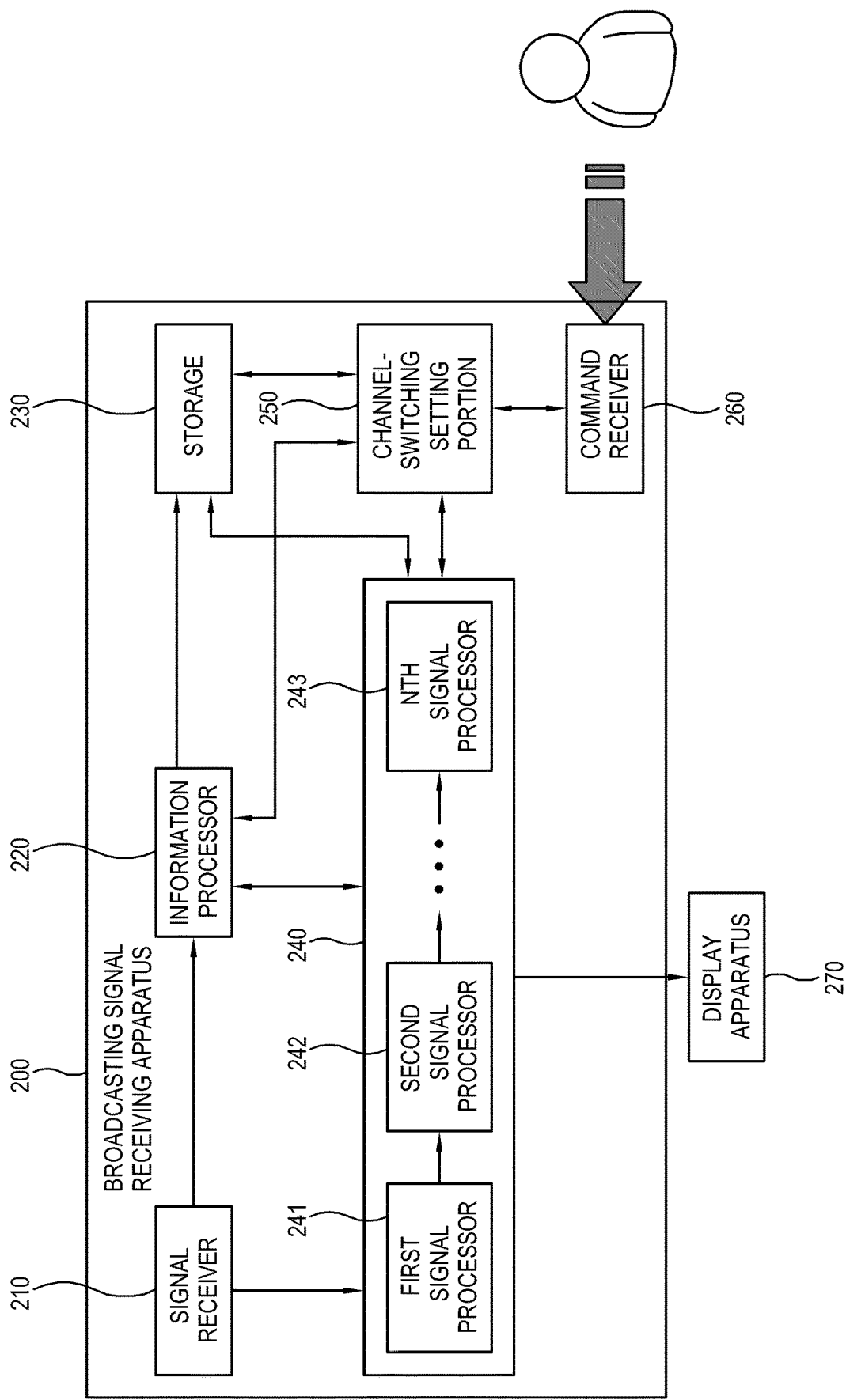
FIG. 2 is a block diagram illustrating an example broadcasting signal receiving apparatus according to an example embodiment.

FIG. 2 is a block diagram illustrating an example broadcasting signal receiving apparatus according to an example embodiment. As illustrated in FIG. 2, a broadcasting signal receiving apparatus 200 according to an example embodiment includes a signal receiver 210, an information processor 220, a storage 230, a signal processor 240, a channel switching setting portion 250 and a command receiver 260, and may be for example achieved by a set-top box. The broadcasting signal receiving apparatus 200 may be connected to a display apparatus 270, for example, to a TV. The signal receiver 210, the information processor 220, the storage 230, the signal processor 240, the channel switching setting portion 250 and the command receiver 260 among the elements of the broadcasting signal receiving apparatus 200 are equivalent to the signal receiver 110, the information processor 120, the storage 130, the signal processor 140, the channel switching setting portion 150 and the command receiver 160 among the elements of the broadcasting signal receiving apparatus 100 illustrated in FIG. 1, and thus only different elements will be described while avoiding repetitive descriptions.

The channel switching setting portion 250 receives a user's channel switching command through the command receiver 260, and performs a channel-switching setting operation for at least one among a plurality of signal processors 240 based on the channel information stored in the storage 230 in response to the channel switching command. The plurality of signal processors 240 includes a first signal processor 241, a second signal processor 242, . . . , an Nth signal processor 243, and may be for example achieved by a tuner, a demultiplexer, an audio/video decoder, a scaler, etc.

The channel-switching setting operation may include an operation of setting the tuner among the plurality of signal processors 240 to check tuner lock, an operation of setting the demultiplexer to extract audio and video data using the stored A/V PID, an operation of setting the decoder to decode audio and video data with regard to a broadcasting signal using the stored resolution information, an operation of setting the scaler to display an image of a broadcasting signal based on the stored rating information.

The broadcasting signal receiving apparatus 200 may be for example achieved by the set-top box, and transmit a broadcasting signal processed in the signal processor 240 to the display apparatus 270 so that the display apparatus 270 can display an image based on the processed broadcasting signal. The display apparatus 270 may be for example achieved by the TV, and displays an image based on the processed broadcasting signal by receiving the processed broadcasting signal from the broadcasting signal receiving apparatus 200.

According to this example embodiment, the broadcasting signal receiving apparatus 200 performs the setting operations for the signal processes so that the stored channel information can be used for quickly switching a channel of a broadcasting signal when the channel is switched. Thus, the broadcasting signal receiving apparatus 200 can support the connected display apparatus 270 so that the connected display apparatus 270 can quickly switch to a screen of a corresponding channel in response to the channel switching command.

Further, the broadcasting signal receiving apparatus 200 can perform the process of the channel information embedded in the broadcasting signal and the setting operations for the plurality of signal processes in parallel when the channel is switched, thereby having an advantage of minimizing and/or reducing dependence on the performance of the CPU.

Figure 3:
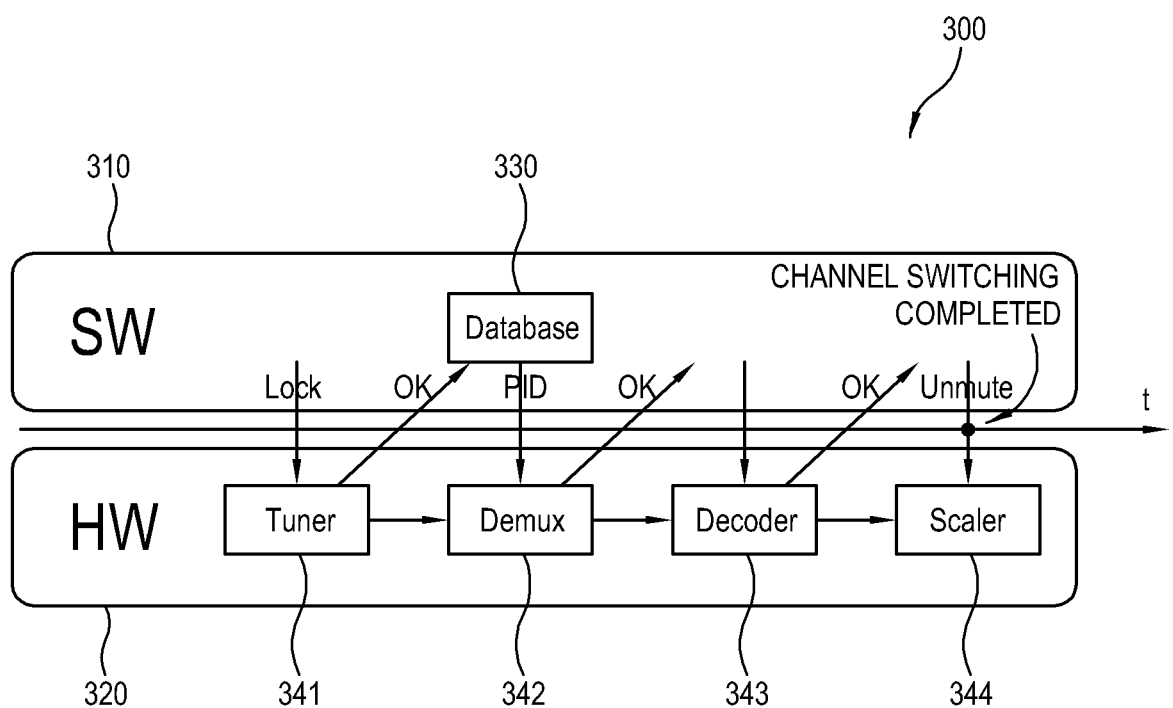
FIG. 3 is a diagram illustrating an example of switching a channel in the broadcasting signal receiving apparatus of the related art.

FIG. 3 is a diagram illustrating an example of switching a channel in the broadcasting signal receiving apparatus of the related art. As illustrated in FIG. 3, a broadcasting signal receiving apparatus 300 of the related art sets a tuner 341 to sense a locked broadcasting signal with intervention of application S/W 310 when a channel is switched in a state that channel information about a previously received broadcasting signal is stored in a database 330, and provides channel information, e.g. audio/video packet identification (A/V PID) stored in the database 330 so that a demultiplexer 342 can extract audio and video data from audio/video packet identification (A/V PID) in response to a response from the tuner 341. Further, if the application S/W 310 receives a response from the demultiplexer 342, the resolution information of the received channel information embedded in the broadcasting signal is for example processed provided to set a decoder 343 to decode the audio and video data with respect to the broadcasting signal. If the application S/W 310 receives a response from the decoder 343, the rating information of the received channel information is processed and provided to set the scaler 344 to determine whether to display an image of the broadcasting signal. Thus, if such sequential setting operations are fully carried out in the respective elements of the H/W 320, the channel switching is completed so that an audience can watch a screen of the switched channel.

In the broadcasting signal receiving apparatus 300 of the related art, the application S/W 310 receives and processes the responses from the respective elements of the H/W 320 in sequence when the channel is switched, and therefore channel-switching speed is affected by the performance of the CPU. Thus, the broadcasting signal receiving apparatus 300 of the related art has a problem of making the channel switching speed slow down depending on the performance of the application S/W even though the previously stored channel information is used for the signal process when a channel is switched.

Figure 4:
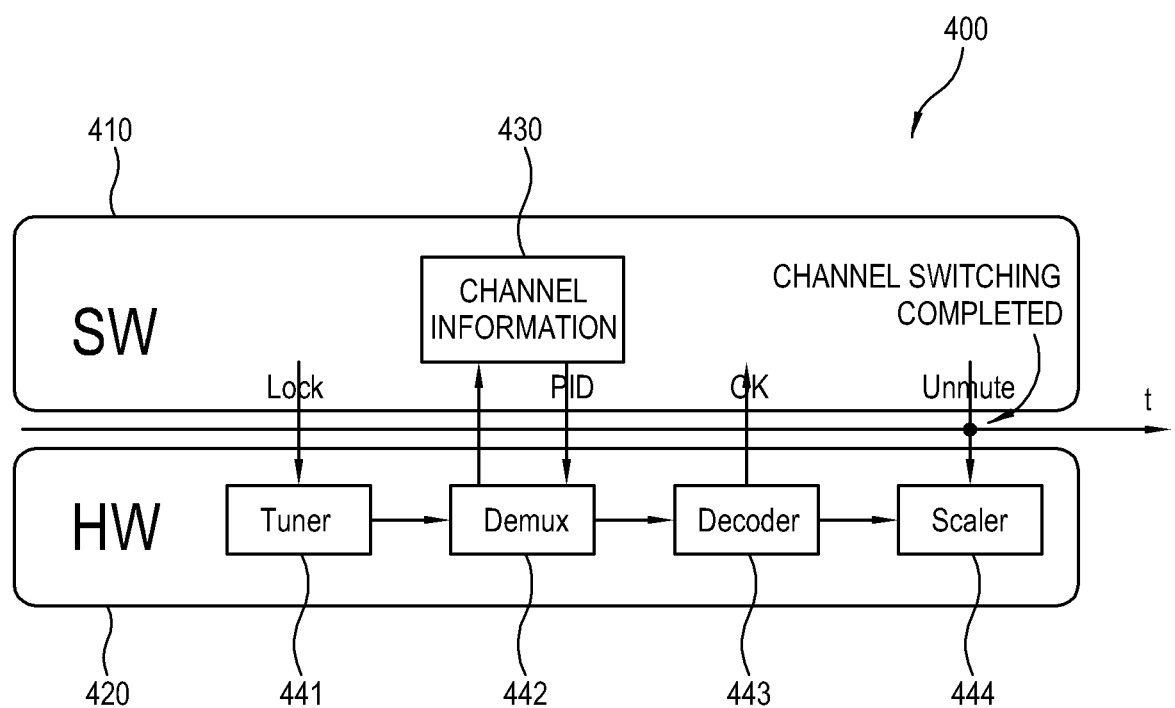
FIG. 4 is a diagram illustrating an example of switching a channel in the broadcasting signal receiving apparatus according to an example embodiment in a case where channel information is not stored.

FIG. 4 is a diagram illustrating an example of switching a channel in the broadcasting signal receiving apparatus according to an example embodiment in a case where channel information is not stored. As illustrated in FIG. 4, if channel information of a previously received broadcasting signal is not stored in a broadcasting signal receiving apparatus 400, application S/W 410 receives a broadcasting signal when a channel is switched, and sets a tuner 441 among elements of H/W 420 to sense a locked broadcasting signal when the broadcasting signal is fully received. When the tuner 441 is completely set, the application S/W 410 for example analyzes and processes A/V PID from the channel information of the received broadcasting signal, and sets a demultiplexer 442 to extract audio and video data from the processed A/V PID. When the demultiplexer 442 is completely set, the application S/W 410 for example analyzes and processes resolution information from the channel information of the received broadcasting signal, and sets a decoder 443 to decode audio and video data with respect to the broadcasting signal based on the processed resolution information. If the decoder 442 is completely set, the application S/W 410 for example analyzes rating information from the channel information of the received broadcasting signal, and sets a scaler 444 to determine whether to display an image based on the processed rating information. Thus, the channel switching is completed when all the sequential setting operations are completed in the respective elements of the H/W 420 using the channel information processed in the application S/W 410, and a user can view a screen corresponding to the switched channel.

In the broadcasting signal receiving apparatus 400, if there are no stored channel information when a channel is switched, the application S/W 410 analyzes and processes the received channel information embedded in the broadcasting signal, and performs the settings for switching the channel based on the channel information processed in the respective elements of the H/W 420.

Figure 5:
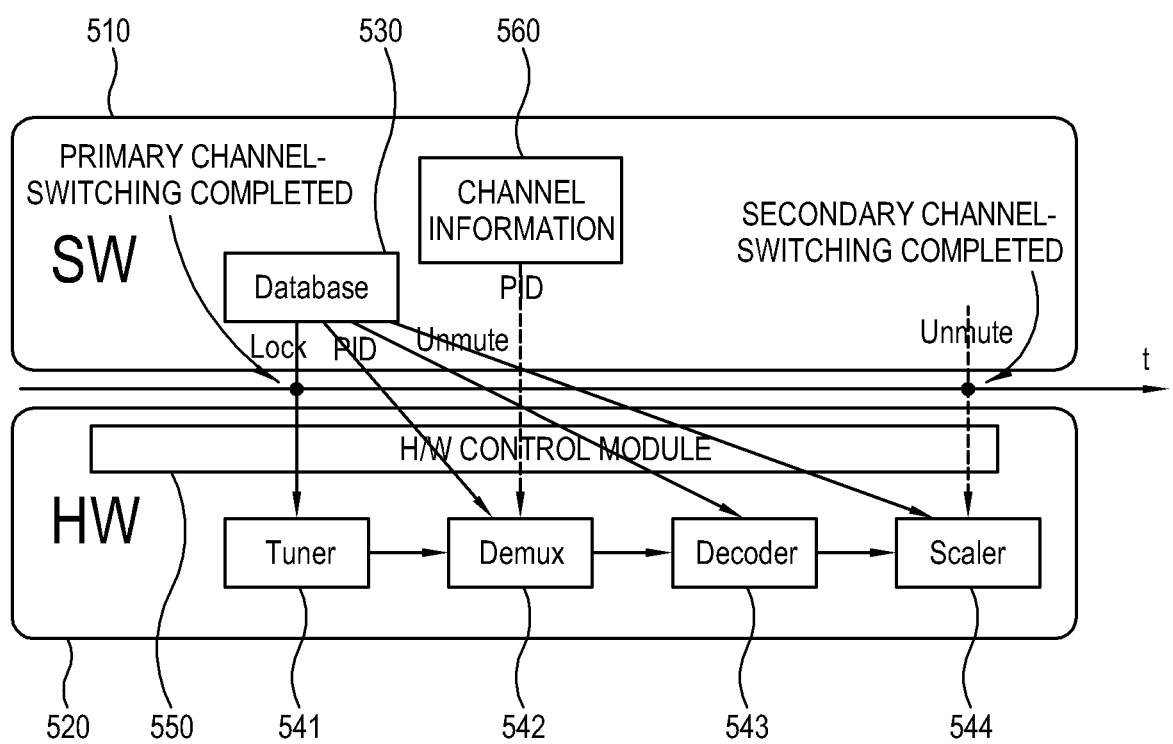
FIG. 5 is a diagram illustrating an example of switching a channel in the broadcasting signal receiving apparatus according to an example embodiment in a case where channel information is stored.

FIG. 5 is a diagram illustrating an example of switching a channel in the broadcasting signal receiving apparatus according to an example embodiment in a case where channel information is stored. As illustrated in FIG. 5, a broadcasting signal receiving apparatus 500 includes application S/W 510, a database 530 and a H/W 520, and the H/W 520 includes a H/W control module 550, a tuner 541, a demultiplexer 542, a decoder 543 and a scaler 544. The application S/W 510, the database 530 and the H/W control module 550 among the elements of the broadcasting signal receiving apparatus 500 respectively correspond to the information processor 120, the storage 130 and the channel switching setting portion 150 of the broadcasting signal receiving apparatus 100 of FIG. 1. Further, the tuner 541, the demultiplexer 542, the decoder 543 and the scaler 544 correspond to the plurality of signal processors 140 among the elements of the broadcasting signal receiving apparatus 100 illustrated in FIG. 1.

When a channel is switched in the state that channel information of a previously received broadcasting signal is stored in the database 530, the application S/W 510 of the broadcasting signal receiving apparatus 500 for example provides audio and video packet identification, resolution information, rating information, etc. of the channel information stored in the database 530 to the H/W control module 550. The H/W control module 550 performs settings for switching the channel in the respective elements of the H/W 520 based on the stored channel information provided by the application S/W 510. The H/W control module 550 makes the channel information stored in the database 530 be provided in a lump to the respective elements of the H/W 520 at a point of time when tuning is carried out for the channel switching. Further, the H/W control module 550 for example controls the tuner 541, the demultiplexer 542, the decoder 543 and the scaler 544 among the elements of the H/W 520 to respectively perform their corresponding settings using the channel information provided in a lump.

According to an example embodiment, the H/W control module 550 may set the tuner 541 to do a lock checking operation with respect to a broadcasting signal when a channel is switched. Further, the H/W control module 550 may set the demultiplexer 542 to extract audio and video data using the A/V PID stored in the database 530. Further, the H/W control module 550 may set the decoder 543 to decode audio and video data with respect to a broadcasting signal based on the resolution information stored in the database 530. Further, the H/W control module 550 may set the scaler 544 to determine whether to display an image of a broadcasting signal based on the rating information stored in the database 530.

According to an example embodiment, while the H/W control module 550 carries out the settings for switching a channel in the respective elements of the H/W 520 using the channel information stored in the database 530, the application S/W 510 in parallel analyzes whether the channel information stored in the database 530 is different from the received channel information 560 embedded in the broadcasting signal. As an analysis result of the application S/W 510, if the stored channel information is different from the received channel information 560, not the stored channel information but the received channel information 560 is used for performing the settings for switching the channel in the respective elements of the H/W 520. For example, if the rating information of the stored channel information indicates "all ages" but the rating information of the currently received broadcasting signal indicates "restricted to 18 years and over", the currently received rating information is applied to set the scaler 544 not to display an image when a user under 18 years logs on.

Thus, if the settings for the signal processes are completed as the application S/W 510 applies the stored channel information to the respective elements of the H/W 520 in a lump at the tuning time, primary channel switching is done. Further, as an analysis result of the application S/W 510, if the received channel information 560 embedded in the broadcasting signal is different from the stored channel information, the changed channel information is used in performing the setting operations, thereby completing secondary channel switching. Therefore, if the channel information is not changed, an audience can watch a screen early at a point of time when the primary channel switching is completed. On the other hand, if the channel information is changed, an audience can watch a screen at a point of time when the secondary channel switching is completed.

In the broadcasting signal receiving apparatus 500 according to an example embodiment, the H/W control module 550 applies the stored channel information in a lump to the settings for the plurality of signal processes at the tuning time responding to the channel switching command, so that the channel can be quickly switched. Further, the H/W control module 550 and the application S/W 510 are operated in parallel when the channel is switched, thereby quickly switching a channel with the minimum dependence on the performance of the CPU.

Figure 6:
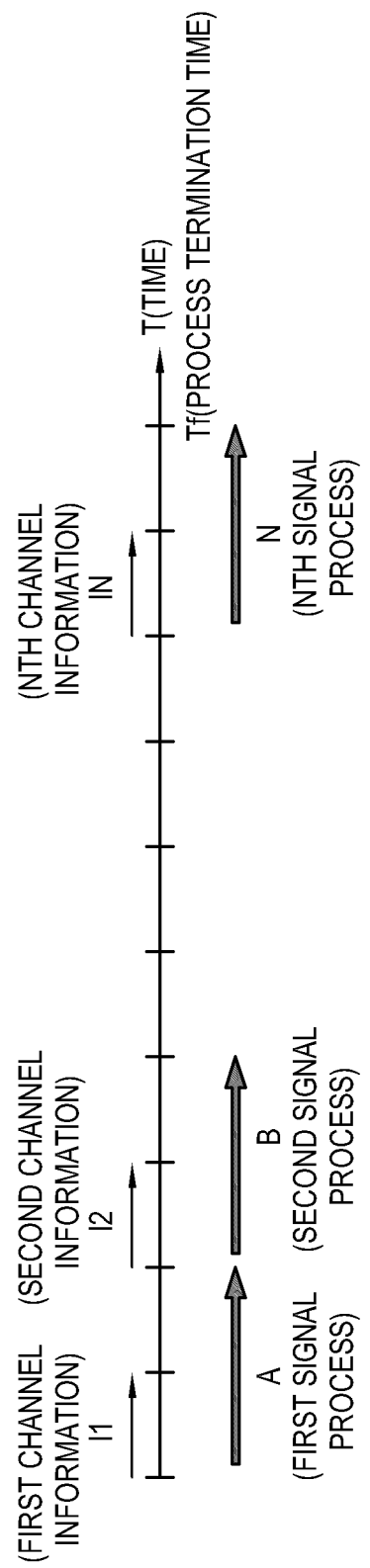
FIG. 6 is a diagram illustrating an example of processing a signal according to an example embodiment in a case where channel information is not stored.

FIG. 6 is a diagram illustrating an example of processing a signal according to an example embodiment in a case where channel information is not stored. As illustrated in FIG. 6, if the channel information is not stored in the broadcasting signal receiving apparatus according to an example embodiment when a channel is switched, the information processor 120 processes the received channel information embedded in the broadcasting signal, and the channel switching setting portion 150 makes the plurality of signal processors 140 use the processed channel information to perform the settings for the single processes in their respective signal processes. For example, first channel information I1 of the received channel information embedded in the broadcasting signal is processed so that a signal process setting operation can be performed using the first channel information I1 in a first signal process A. Next, second channel information I2 is processed so that a signal process setting operation can be performed using the second channel information I2 in a second signal process B. Through such sequential procedures, the last Nth channel information IN is processed so that a signal process setting operation can be performed using the Nth channel information IN in the Nth signal process N. Thus, all the signal processes for switching a channel are completely set at a process termination time Tf and thus the channel is switched.

Figure 7:
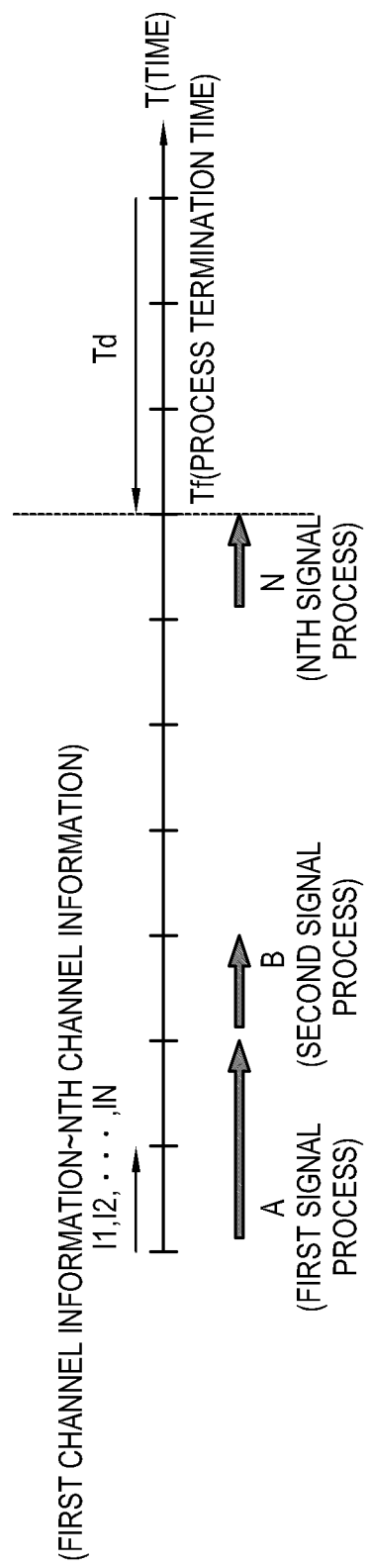
FIG. 7 is a diagram illustrating an example of processing a signal according to an example embodiment in a case where channel information is stored.

FIG. 7 is a diagram illustrating an example of processing a signal according to an example embodiment in a case where channel information is stored. As illustrated in FIG. 7, if the channel information is stored in the broadcasting signal receiving apparatus according to an example embodiment when a channel is switched, the information processor 120 provides the stored channel information, and the channel switching setting portion 150 uses the stored channel information to make the plurality of signal processors 140 carry out the settings for the signal processes in their respective signal processes. For example, the stored first channel information I1, the stored second channel information I2, . . . , the stored Nth channel information IN are simultaneously applied in the first signal process A, the first channel information I1, the second channel information I2, . . . , the Nth channel information IN are used to sequentially perform the signal process setting operations in the first signal process A, the second signal process B, . . . , the Nth signal process N. As compared with the case that the channel information is not stored, time taken in the processes is shortened by Td and thus the channel is quickly switched.

Figure 8:
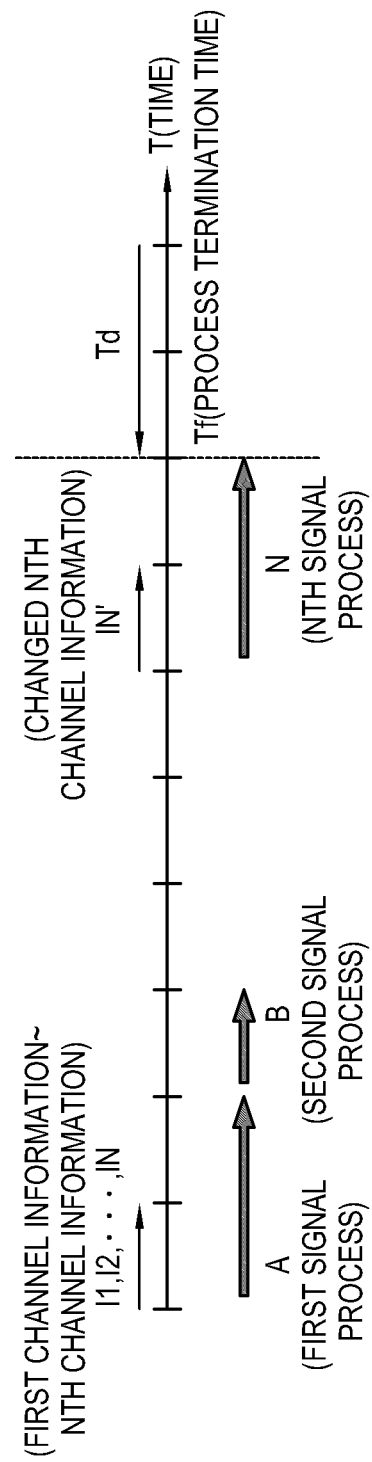
FIG. 8 is a diagram illustrating an example of processing a signal according to an example embodiment in a case where the channel information is changed.

FIG. 8 is a diagram illustrating an example of processing a signal according to an example embodiment in a case where the channel information is changed. As illustrated in FIG. 8, if the channel information is stored in the broadcasting signal receiving apparatus according to an example embodiment when a channel is switched, the information processor 120 provides the stored channel information, and the channel switching setting portion 150 uses the stored channel information to make the plurality of signal processors 140 perform the settings for the signal processes in their respective signal processes. For example, the stored first channel information I1, the stored second channel information I2, . . . , the stored Nth channel information IN are simultaneously applied in the first signal process A, and the first channel information I1, the second channel information I2, . . . , the Nth channel information IN are used to sequentially perform the signal process setting operations in the first signal process A, the second signal process B, . . . , the Nth signal process N.

As described above, while the channel switching setting portion 150 performs the signal process setting operation based on the stored channel information, the information processor 120 analyzes whether the stored channel information is different from the channel information embedded in the currently received broadcasting signal. If the stored channel information is different from the received channel information, the changed channel information IN' is processed and provided to the channel switching setting portion 150. The channel switching setting portion 150 uses the stored channel information to sequentially perform the signal process setting operations in the first signal process A, the second signal process B, . . . , the Nth signal process N, and uses the lastly changed channel information IN' to perform the signal process setting operation again in the Nth signal process N. Alternatively, if the changed channel information IN' is processed before the Nth signal process N, not the stored channel information IN but the changed channel information IN' is used to perform the signal process setting operation in the Nth signal process N.

Thus, as compared with the case that the channel information is not stored, time taken in the processes is shortened by Td. Further, the operation of analyzing whether the channel information is changed is performed in parallel with the signal process setting operation, thereby quickly switching the channel while minimizing and/or reducing the dependence on the performance of the CPU.

Figure 9:
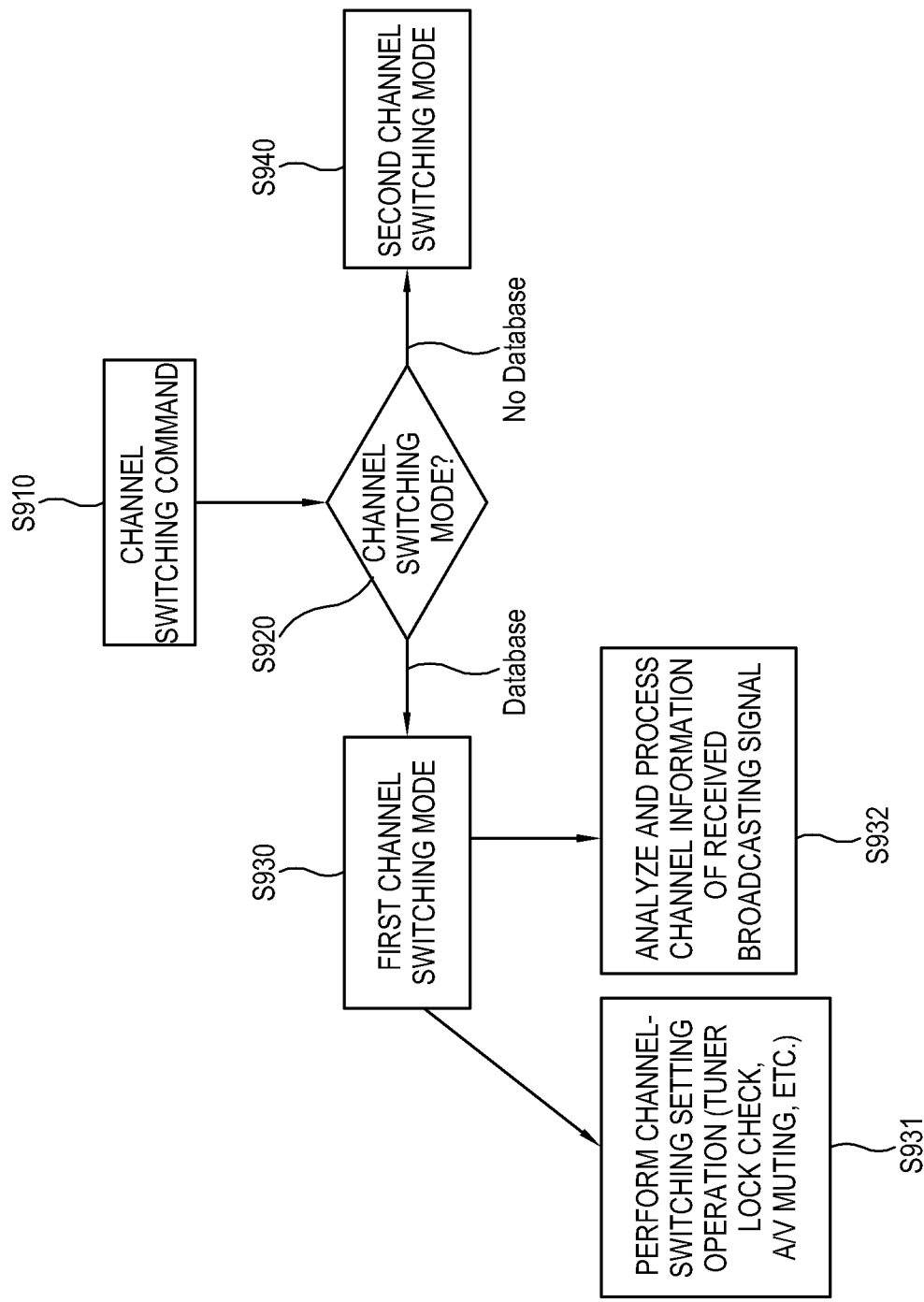
FIG. 9 is a flowchart illustrating an example channel-switching setting method in a channel switching mode according to an example embodiment.

FIG. 9 is a flowchart illustrating an example channel-switching setting method in a channel switching mode according to an example embodiment. As illustrated in FIG. 9, at operation S910, a user's command for switching a channel is first received. Next, at operation S920, it is determined whether to operate in a first channel switching mode for quick channel switching or a second channel switching mode for general channel switching in accordance with whether or not the channel information of the broadcasting signal is stored in the database. At this time, the channel information stored in the database includes at least one among the A/V PID, the resolution information and the rating information. In the operation S920, if the channel information is stored in the database, the operation is performed in the first channel switching mode at operation S930. On the other hand, if the channel information is not stored in the database, the operation is performed in the second channel switching mode at operation S940.

In the operation S930, if the operation is performed in the first channel switching mode, the H/W control module performs the setting operations for the plurality of signal processes based on the stored channel information in response to channel switching at operation S931. For example, the setting operation may include an operation of setting the tuner to perform the tuner lock check, and an operation of setting the demultiplexer to extract audio and video data using the A/V PID of the stored channel information. Further, the setting operation may include an operation of setting the decoder to decode audio and video data using the stored resolution information with respect to the broadcasting signal, and an operation of setting the scaler to do A/V muting for determining whether to display an image based on the rating information of the stored channel information.

Further, in the operation S930, if the operation is performed in the first channel switching mode, an operation S932 is performed in parallel with the operation S931. In the operation S932, the application S/W analyzes and processes the received channel information embedded in the broadcasting signal, and determines whether the analyzed channel information is different from the stored channel information. At this time, if the analyzed channel information is different from the stored channel information, the H/W control module may use the analyzed channel information in performing the setting operation for the signal process again. For example, if the rating information of the stored channel information indicates "all ages" but the rating information of the currently received broadcasting signal indicates "restricted to 18 years and over", the currently received rating information is used to set the scaler not to display an image when a user under 18 years logs on.

In the operation S940, if the operation is performed in the second channel switching mode, the application S/W analyzes and processes the received channel information embedded in the broadcasting signal, and uses the processed channel information to sequentially perform the respective setting operations in the plurality of signal processes.

According to an example embodiment, in the case where the operation is performed in the first channel switching mode in the operation S930, the operation 931 of performing the settings for the signal processes using the stored channel information is performed in parallel with the operation S932 of processing the channel information of the received broadcasting signal, thereby minimizing and/or reducing the dependence on the performance of the CPU and thus having an effect on quickly switching a channel when the channel is switched. Since the first channel switching mode or the second channel switching mode is selected in accordance with whether or not the channel information is stored in the database, it is possible to efficiently and properly switch a channel in accordance with circumstances.

Figure 10:
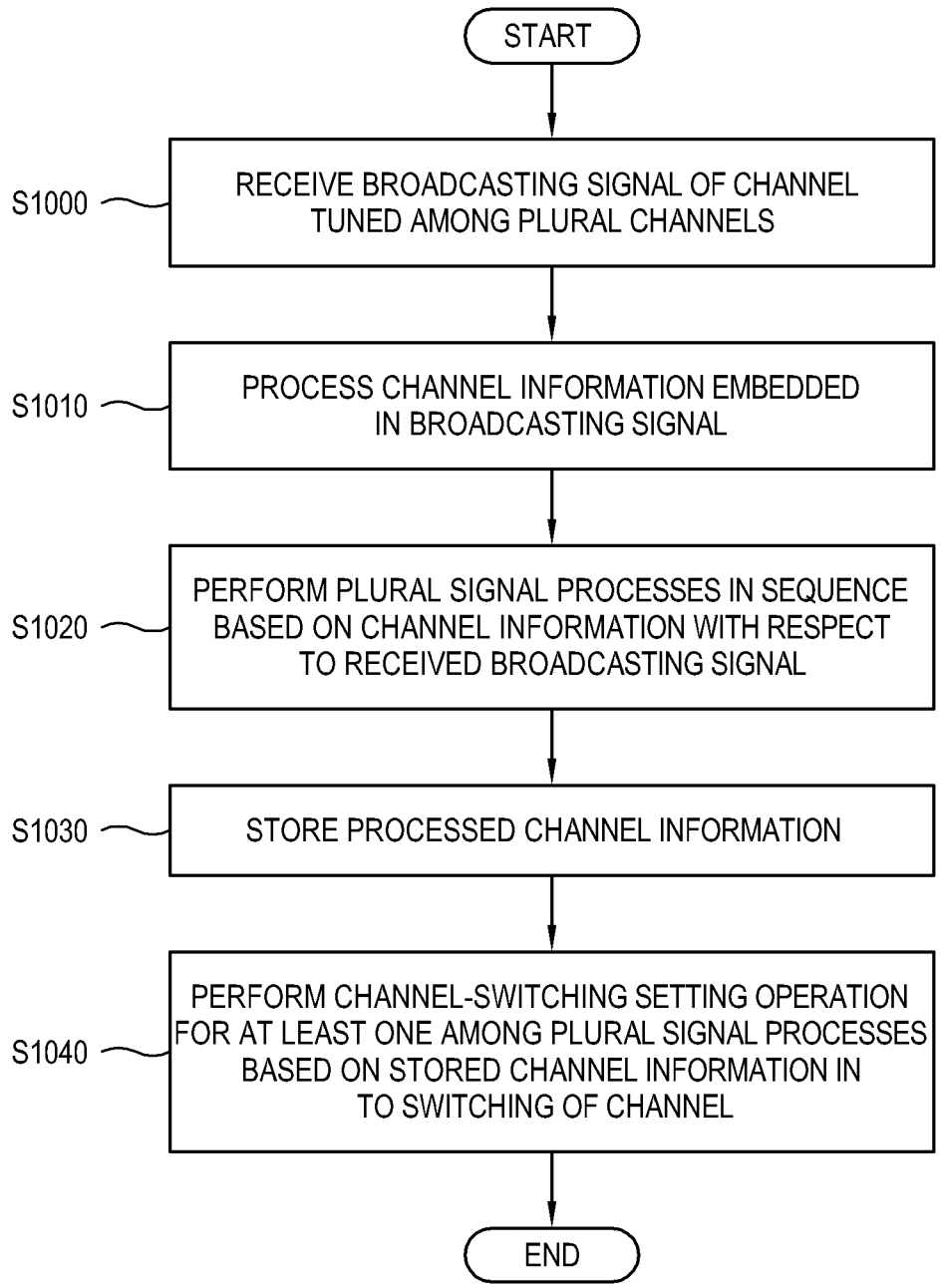
FIG. 10 is a flowchart illustrating an example method of controlling a broadcasting signal receiving apparatus according to an example embodiment.

FIG. 10 is a flowchart illustrating an example method of controlling a broadcasting signal receiving apparatus according to an example embodiment. As illustrated in FIG. 10, at operation S1000, a broadcasting signal is received through a channel tuned among a plurality of channels. At operation S1010, the channel information embedded in the broadcasting signal is processed. Here, the channel information may include information about at least one among A/V PID, resolution and the rating, which are embedded in the broadcasting signal. Next, at operation S1020, the plurality of signal processes are sequentially performed based on the channel information with respect to the received broadcasting signal. The plurality of signal processes may include tuning, demultiplexing, decoding, scaling, etc. At operation S1030, the processed channel information is stored.

At operation S1040, in response to the channel switching, the channel-switching setting operation related to at least one among the plurality of signal processes is performed based on the stored channel information. In the tuning process, the channel-switching setting operation may include a setting operation for a tuner lock checking operation. In the demultiplexing process, the channel-switching setting operation may include a setting operation for extracting audio and video data from the broadcasting signal by using the A/V PID of the stored channel information In the decoding process, the channel-switching setting operation may include a setting operation for decoding audio and video data with respect to the broadcasting signal by using the resolution information of the stored channel information. In the scaling process, the channel-switching setting operation may include a setting operation for determining whether to display an image of the broadcasting signal based on the rating information of the stored channel information.

According to this example embodiment, the setting operations for the respective signal processes are performed using the previously stored channel information not after fully processing the received channel information, thereby having an effect on quickly switching a channel.

According to an example embodiment, the operation S1040 may include an operation of simultaneously performing the channel-switching setting operations with respect to the plurality of signal processes. That is, the stored channel information is applied in a lump at the tuning time so that the settings for the plurality of signal processes can be performed at the same time, thereby improving channel-switching speed.

Alternatively, the operation S1010 may include an operation of determining whether the stored channel information is different from the received channel information embedded in the broadcasting signal. At this time, if the stored channel information is different from the received channel information embedded in the broadcasting signal, the operation S1040 may include an operation of performing the channel-switching setting operation based on the received channel information embedded in the broadcasting signal. For example, if at least one among a plurality of pieces of channel information embedded in the received broadcasting signal is changed, the changed channel information is used in performing the setting operation again in the corresponding signal process. Thus, the channel information of the received broadcasting signal is not fully processed to perform the settings for the signal processes, but only the signal process corresponding to the changed channel information is set again, thereby switching the channel quickly.

Alternatively, the operation S1040 may include an operation of performing the channel-switching setting operation based on the received channel information embedded in the broadcasting signal if the channel information is not stored. For example, if it is desired to switch to the channel viewed for the first time, there are no previously received and stored channel information. Therefore, the channel information of the currently received broadcasting signal is processed, and the channel information processed in each of the plurality of signal processes is used to perform the setting operations for the signal process, thereby completing the channel switching.

Figure 11:
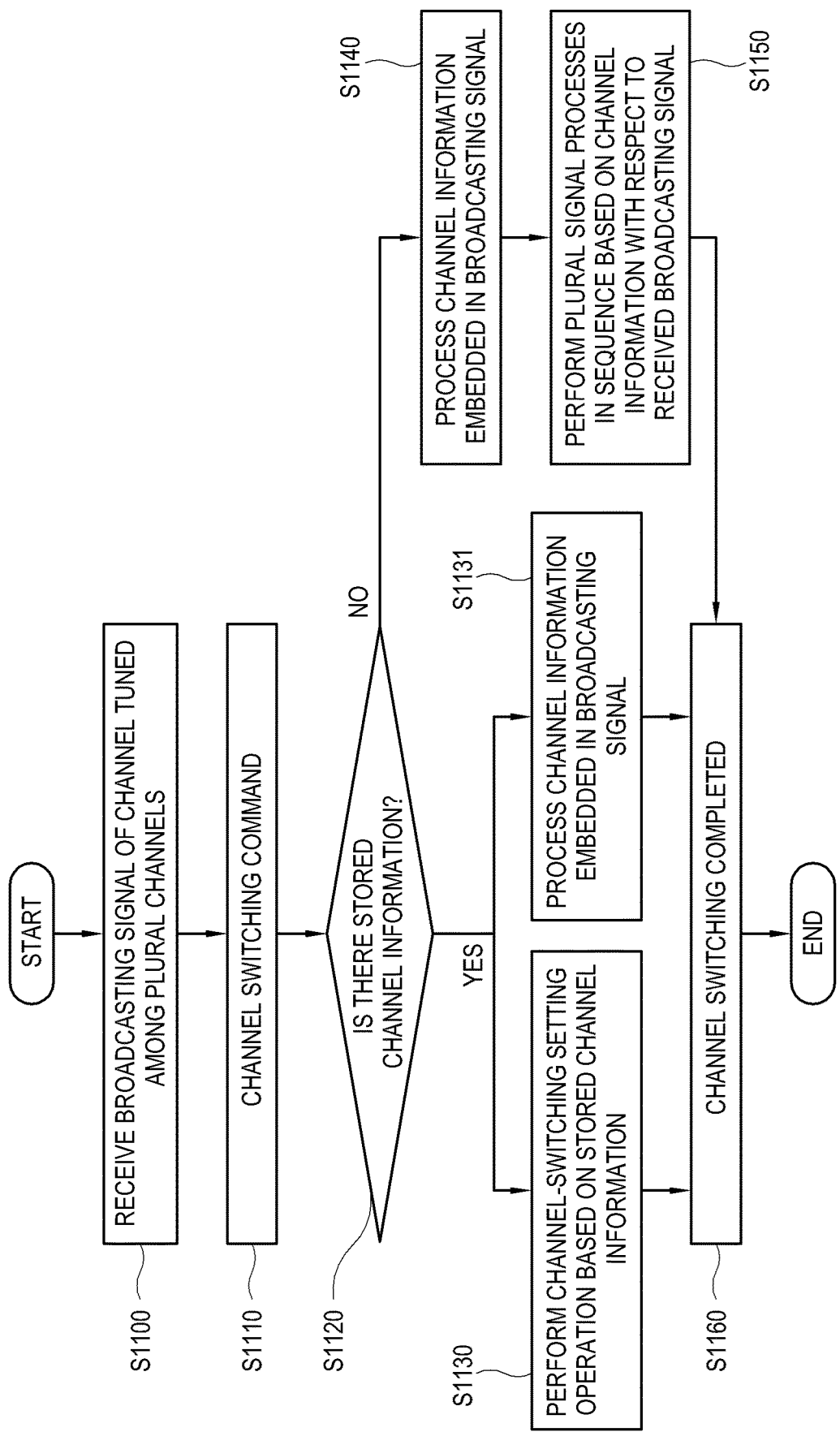
FIG. 11 is a flowchart illustrating an example method of controlling a broadcasting signal receiving apparatus according to an example embodiment.

FIG. 11 is a flowchart illustrating an example method of controlling a broadcasting signal receiving apparatus according to an example embodiment. As illustrated in FIG. 11, at operation S1100, a broadcasting signal is received through a channel tuned among a plurality of channels. Next, a channel switching command is received at operation S1110, and it is determined at operation S1120 whether there is the stored channel information. In the operation S1120, if it is determined that there is the stored channel information, an operation S1130 and an operation S1131 are performed in parallel. In the operation S1130, the channel-switching setting operation is performed based on the stored channel information. In the operation S1131, the received channel information embedded in the broadcasting signal is processed. If the operation S1130 and the operation S1131 are done, the channel switching is completed at operation S1160.

According to an example embodiment, the operation S1130 may include an operation of setting the tuner to perform a lock check operation, an operation of setting the demultiplexer to extract audio and video data from the broadcasting signal by using the stored A/V PID, an operation of setting the decoder to decode the audio and video data with respect to the broadcasting signal by using the stored resolution information, and operation of setting the scaler to determine whether to display an image of the broadcasting signal based on the stored rating information, etc.

According to an example embodiment, the operation S1131 includes an operation of determining whether the received channel information embedded in the broadcasting signal is different from the stored channel information. At this time, if the received channel information embedded in the broadcasting signal is different from the stored channel information, the operation S1130 may further include an operation of performing the channel-switching setting operation by the received channel information.

On the other hand, if it is determined in the operation S1120 that there are no stored channel information, at operation S1140 the channel information embedded in the broadcasting signal is processed, and at operation S1150 the plurality of signal processes are sequentially performed with respect to the received broadcasting signal based on the processed channel information. Last, in the operation S1160 the channel switching is completed.

Figure 12:
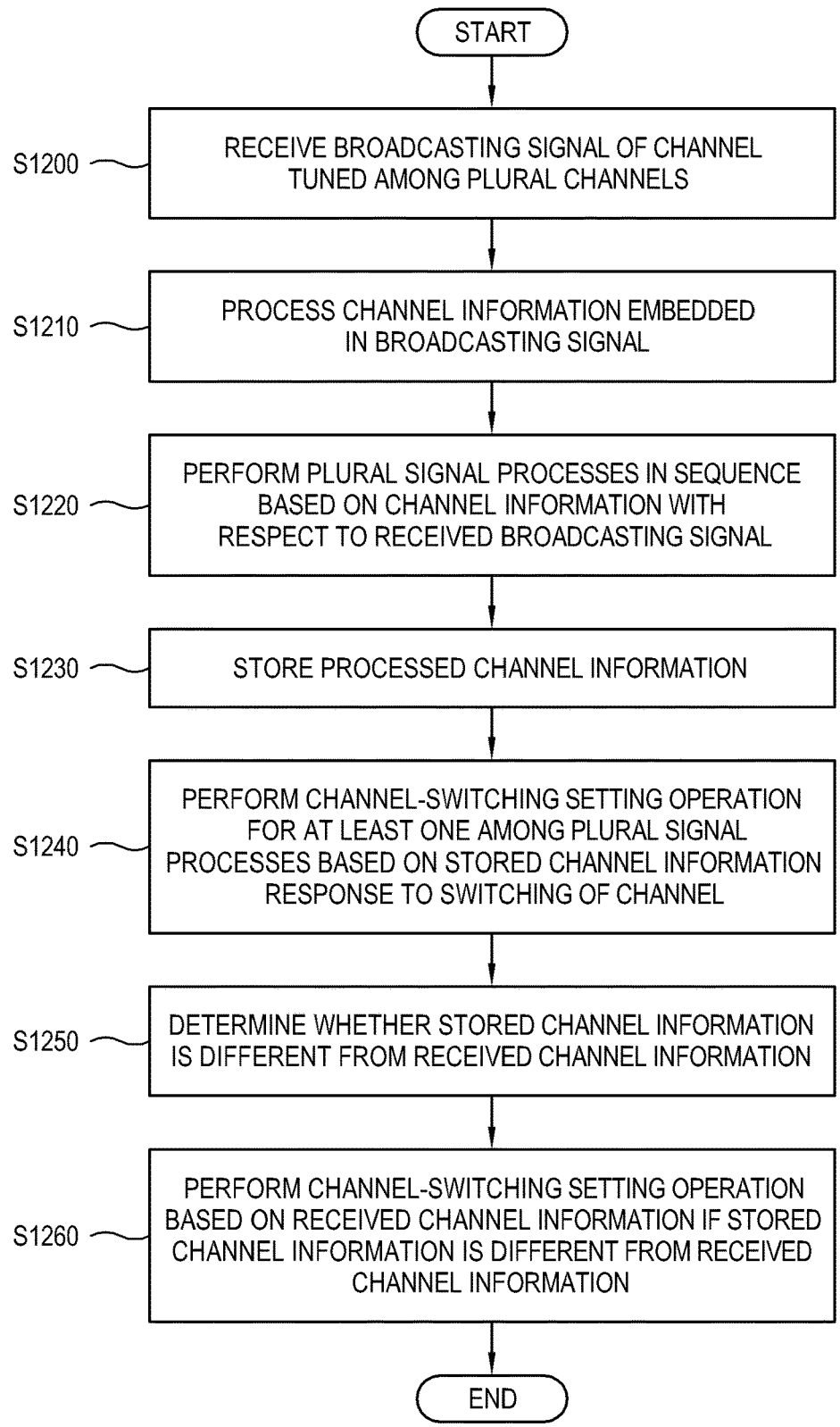
FIG. 12 is a flowchart illustrating an example method of controlling a broadcasting signal receiving apparatus according to an example embodiment.

FIG. 12 is a flowchart illustrating an example method of controlling a broadcasting signal receiving apparatus according to an example embodiment. As illustrated in FIG. 12, at operation S1200 a broadcasting signal is received through a channel tuned among a plurality of channels, and at operation S1210 the channel information embedded in the broadcasting signal is processed. Next, at operation S1220 the plurality of signal processes are sequentially performed based on the channel information with respect to the received broadcasting signal, and at operation S1230 the processed channel information is stored.

At operation S1240, the channel-switching setting operation for at least one among the plurality of signal processes is performed based on the stored channel information in response to channel switching. At operation S1250, it is determined whether the stored channel information is different from the received channel information. Next, at operation S1260, if the stored channel information is different from the received channel information, the channel-switching setting operation is performed based on the received channel information. Here, the operation S1240 may be performed by the H/W control module 550 of FIG. 5, and the operation S1250 may be performed by the application S/W 510 of FIG. 5. Further, the operation S1240 and the operation S1250 may be performed in parallel.

As described above, the broadcasting signal receiving apparatus according to an example embodiment has an effect on quickly switching a channel by using the stored channel information when a channel of a broadcasting signal is switched.

Further, according to an example embodiment, when a channel is switched, the process of the channel information embedded in the broadcasting signal is performed in parallel with the setting operations for the plurality of signal processes, thereby minimizing and/or reducing dependence on the performance of the CPU.

Although a few example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A broadcasting signal receiving apparatus comprising:
a signal receiver configured to receive a broadcasting signal of a tuned channel from among a plurality of channels;
a plurality of signal processors configured to perform a plurality of signal processes on the received broadcasting signal;
a storage; and
a processor configured to:
receive a user command for changing a channel;
based on a channel corresponding to the user command being selected a first time, sequentially perform a first operation for setting up the plurality of signal processors and a second operation for processing channel information included in the received broadcasting signal, and storing information obtained as a result of performing the first and the second operations in the storage; and
based on the channel corresponding to the user command being selected a second time, perform the second operation in parallel with performing the first operation based on the information stored in the storage.

2. The broadcasting signal receiving apparatus according to claim 1, wherein the channel information comprises at least one of audio/video packet identification (A/V PID), resolution information, and rating information included in the broadcasting signal.

3. The broadcasting signal receiving apparatus according to claim 1, wherein the plurality of signal processors comprises a tuner, a demultiplexer, a decoder, and a scaler.

4. The broadcasting signal receiving apparatus according to claim 3, wherein the first operation comprises setting the tuner to perform a tuner lock check operation.

5. The broadcasting signal receiving apparatus according to claim 3, wherein the first operation comprises setting the demultiplexer to extract audio and video data from the broadcasting signal using audio/video packet identification (A/V PID) of the stored first channel information.

6. The broadcasting signal receiving apparatus according to claim 3, wherein the first operation comprises setting the decoder to decode audio and video data with respect to the broadcasting signal using resolution information of the stored first channel information.

7. The broadcasting signal receiving apparatus according to claim 3, wherein the first operation comprises setting the scaler to identify whether to display an image of the broadcasting signal based on rating information of the stored first channel information.

8. The broadcasting signal receiving apparatus according to claim 1, wherein the second operation further comprises:
identifying whether the processed channel information is different from channel information stored in the storage, and
based on the processed channel information being different from the stored channel information, re-performing the first operation based on the processed channel information.

9. The broadcasting signal receiving apparatus according to claim 1, wherein the settings of the plurality of signal processors comprises a setting for at least one of a tuner lock check operation, an audio/video data extraction operation, an audio/video data decoding operation or an audio/video mute check operation.

10. A method of controlling a broadcasting signal receiving apparatus, the method comprising:
receiving a broadcasting signal of a channel tuned among a plurality of channels;
receiving a user command for changing the tuned channel;
based on a channel corresponding to the user command being selected a first time, sequentially performing a first operation for setting up a plurality of signal processors and a second operation for processing channel information included in the received broadcasting signal and storing information obtained as a result of performing the first and the second operations in a storage; and
based on the channel corresponding to the user command being selected a second time, performing the second operation in parallel with performing the first operation based on the information stored in the storage.

11. The method according to claim 10, wherein the channel information comprises at least one of audio/video packet identification (A/V PID), resolution information and rating information included in the broadcasting signal.

12. The method according to claim 10, wherein the plurality of signal processors comprises a tuner, a demultiplexer, a decoder and a scaler.

13. The method according to claim 12, wherein the first operation comprises, in tuning by the tuner, performing a tuner lock check operation.

14. The method according to claim 12, wherein the first operation comprises, in demultiplexing by the demultiplexer, extracting audio and video data from the broadcasting signal using audio/video packet identification (A/V PID) of the stored first channel information.

15. The method according to claim 10, wherein the second operation further comprises:
   identifying whether the processed channel information is different from channel information stored in the storage, and
   based on the processed channel information being different from the stored channel information, re-performing the first operation based on the processed channel information.

16. The method according to claim 10, wherein the settings of the plurality of signal processors comprises a setting for at least one of a tuner lock check operation, an audio/video data extraction operation, an audio/video data decoding operation or an audio/video mute check operation.

* * * * *